US011970364B2

(12) United States Patent
Drahohs-Föderler et al.

(10) Patent No.: US 11,970,364 B2
(45) Date of Patent: Apr. 30, 2024

(54) PASSENGER TRANSPORT SYSTEM AND METHOD FOR OPERATING A PASSENGER TRANSPORT SYSTEM

(71) Applicant: INVENTIO AG, Hergiswil (CH)

(72) Inventors: Andreas Drahohs-Föderler, Bad Fischau-Brunn (AT); Christoph Eder, Vienna (AT); Gerhard Stoiber, Zistersdorf (AT)

(73) Assignee: Inventio AG, Hergiswil (CH)

( * ) Notice: Subject to any disclaimer, the term of this patent is extended or adjusted under 35 U.S.C. 154(b) by 53 days.

(21) Appl. No.: 17/802,457

(22) PCT Filed: Feb. 16, 2021

(86) PCT No.: PCT/EP2021/053751
§ 371 (c)(1),
(2) Date: Aug. 25, 2022

(87) PCT Pub. No.: WO2021/170452
PCT Pub. Date: Sep. 2, 2021

(65) Prior Publication Data

US 2023/0097710 A1 Mar. 30, 2023

(30) Foreign Application Priority Data

Feb. 28, 2020 (EP) .................................... 20160128

(51) Int. Cl.
*B66B 29/04* (2006.01)
*B66B 23/22* (2006.01)

(52) U.S. Cl.
CPC .............. *B66B 29/04* (2013.01); *B66B 23/22* (2013.01)

(58) Field of Classification Search
None
See application file for complete search history.

(56) References Cited

U.S. PATENT DOCUMENTS 5,092,446 A * 3/1992 Sullivan, Jr. ............ B66B 29/04 198/331
5,156,252 A * 10/1992 Mello ..................... B66B 23/22 198/338
(Continued)

FOREIGN PATENT DOCUMENTS

CN 205555841 U 9/2016
CN 104909251 B * 4/2017 ........... B66B 25/006
(Continued)

OTHER PUBLICATIONS

International Search Report for International Application No. PCT/EP2021/053751 dated Apr. 26, 2021.

*Primary Examiner* — Joseph A Dillon, Jr.
(74) *Attorney, Agent, or Firm* — Knobbe, Martens, Olson & Bear, LLP

(57) ABSTRACT

A passenger transport system having a conveyor belt is described. The passenger transport system comprises at least one handrail and a fastening device for a protective device in the region of the handrail end curve. A control unit blocks the operation of the passenger transport system in one direction of travel on the basis of a sensor signal, such that, if there is at least one protective device in the region of the handrail end curve, the direction of travel in which the handrail runs into the protective device is blocked. A method for controlling a bidirectional passenger transport system is also described.

20 Claims, 2 Drawing Sheets

(56) References Cited

U.S. PATENT DOCUMENTS

| | | | | |
|---|---|---|---|---|
| 6,752,255 | B2 * | 6/2004 | Lefeuvre | B66B 29/04<br>198/334 |
| 7,404,476 | B2 * | 7/2008 | Yoshida | B66B 29/04<br>198/324 |
| 9,896,309 | B2 * | 2/2018 | Wang | G01V 8/12 |
| 11,661,317 | B2 * | 5/2023 | Boros | B66B 29/02<br>198/322 |
| 2003/0066732 | A1 * | 4/2003 | Lefeuvre | B66B 29/04<br>198/331 |
| 2008/0164117 | A1 * | 7/2008 | Drahohs | B66B 29/04<br>198/321 |

FOREIGN PATENT DOCUMENTS

| | | | | | |
|---|---|---|---|---|---|
| CN | 206088722 | U | | 4/2017 | |
| CN | 107128789 | A | | 9/2017 | |
| CN | 107934730 | A | | 4/2018 | |
| CN | 207551695 | U | | 6/2018 | |
| EP | 3447021 | B1 | * | 5/2023 | B66B 23/00 |
| JP | H0853281 | A | * | 2/1996 | |
| JP | H0853281 | A | | 2/1996 | |
| JP | 2010159156 | A | * | 7/2010 | |
| JP | 2010159156 | A | | 7/2010 | |
| JP | 2011225308 | A | * | 11/2011 | |
| JP | 2012106848 | A | * | 6/2012 | |
| WO | WO-2006099829 | A1 | * | 9/2006 | B66B 23/22 |

* cited by examiner

PASSENGER TRANSPORT SYSTEM AND METHOD FOR OPERATING A PASSENGER TRANSPORT SYSTEM

TECHNICAL FIELD

The disclosure relates to a passenger transport system having a conveyor belt, in particular with the possibility of installing a protective device in the region of the handrail end curve.

SUMMARY

Passenger transport systems in the form of escalators and moving walkways, also known colloquially as moving stairways, moving walks or treadmills, are widely used. In order to offer the passenger an option for holding on during the journey, these are usually equipped with moving handrails.

At the handrail end curve, especially at the end at which the handrail moves out of the handrail inlet cover, accidents can occur because the handrail moves on an arcuate path in this region, the direction of which path does not correspond to that of the conveyor belt. The arrangement of a protective device makes it possible to protect against such accidents at least in part. Such protective devices having curved, solid housings (hereinafter referred to as a protective curve or protective device) have been known for years, but these were simply mounted on the balustrade, regardless of the direction of travel of the handrail. Since this has led to serious accidents involving the hands if the passenger's hand was trapped when the handrail was running in, such a protective device may only be used in a manner specific to the direction of travel. This means that the moving handrail belt may only exit or run out of the end opening, but never enter or run into the end opening of the protective device. This problem has been solved by intervening in the control system to allow operation in only one direction of travel.

However, it may now be the case that after some time the passenger transport system is to be operated in the other direction of travel. The protective curves then have to be mounted at the other end, which, depending on the design, means a considerable amount of effort. In addition, the blocking of the direction of travel must be changed in the control system, which entails additional expenditure of time. With such a comparatively simple change, this leads to considerable downtime of the passenger transport system and must also be carried out by highly qualified personnel.

To solve this problem, JP2010159156A proposes a protective device having motorized bellows. These are extended or retracted depending on the direction of travel. However, such a solution is advantageous only if a very frequent, planned change of direction justifies the high complexity of the system mentioned.

The object of the disclosure is to provide an improved passenger transport system and a method for operating a passenger transport system which is suitable for the installation of protective devices. At the same time, the development of dangerous situations is intended to be prevented by the improved passenger transport system.

The present disclosure, in particular the passenger transport system described herein, solves this problem. The above-mentioned embodiments make it easier to change the direction of travel of a passenger transport system while at the same time maintaining the favorable properties that are achieved by the presence of a protective device, but without significantly increasing the complexity and thus the costs of the passenger transport system.

One aspect of the disclosure relates to a passenger transport system having a conveyor belt, which system comprises at least one balustrade extending substantially in parallel with the conveyor belt and having a first end and a second end, as well as a handrail which is guided circumferentially along the balustrade between the first and second ends of the balustrade, at least one handrail end curve being located at the first end and at the second end. The passenger transport system further comprises a fastening device for mounting a protective device, the fastening device for the protective device being located in the region of the handrail end curve. In addition, the passenger transport system has at least one sensor for detecting the presence of a protective device. The passenger transport system further comprises a control unit connected to the at least one sensor for controlling the direction of travel of the conveyor belt and the handrail, which control unit is designed to operate the passenger transport system in different directions of travel, the control unit blocking the operation of the passenger transport system in one direction of travel on the basis of the sensor signal, such that, if there is at least one protective device in the region of the handrail end curve, the direction of travel in which the handrail runs into the protective device is blocked.

Another aspect of the disclosure relates to a method for controlling a bidirectional passenger transport system. The method comprises determining the presence of a protective device by means of a sensor system configured for this purpose and, based on the determination of the presence of the protective device, preventing the operation of the passenger transport system in a blocked direction of travel, the blocked direction of travel being defined by the handrail entering the protective device.

In an embodiment, one aspect of the disclosure comprises a passenger transport system having a conveyor belt. The passenger transport system can be designed as an escalator having a step belt as a conveyor belt, or in the form of a moving walkway having a pallet belt as a conveyor belt, the term "passenger transport system" being understood to mean that the passenger transport system is intended to transport people, but in principle products and goods such as suitcases, shopping carts, etc. can also be transported. The passenger transport system is primarily used to make it easier for a passenger to cover a distance, the distance in the case of a moving walkway typically extending predominantly horizontally or with an incline of up to approximately 12.5° and in the case of an escalator usually an incline of approximately 20-60° and is designed, for example, to span the path between two floors. For this purpose, the conveyor belt typically moves in such a way that the passenger is able to travel at a specific, constant speed in a direction that remains the same during the journey. The passenger transport system is typically designed predominantly in a straight line, but can also be inclined and curved. The passenger transport system can comprise a first end and a second end, one of the ends typically serving as an entry end and a second end as an exit end during operation.

In an embodiment, the passenger transport system comprises at least one balustrade, typically two balustrades. The balustrade extends in parallel with the direction of travel of the conveyor belt and has a first end and a second end, the first end and the second end being understood to mean the ends between which the balustrade extends in the direction of travel, and it being possible for the first and the second ends to correspond to the entry and exit ends, respectively, of the passenger transport system. The balustrade is usually used to delimit the passenger transport system from the outside and thereby protect the passenger from unintentionally leaving the conveyor belt in a lateral direction. Furthermore, the balustrade can be used to accommodate display and control elements, as well as to guide a handrail. The balustrade can be made from a variety of suitable materials and composites.

In an embodiment, the passenger transport system comprises one or more handrails, each handrail being guided along a balustrade. The handrail can be made of a flexible material, for example, a rubber-textile band, which is mounted on the balustrade in such a way that it is moved along the balustrade as a result of the action of a driving force. The handrail can move at largely the same speed and in the same direction as the conveyor belt, so that it is possible for a passenger to support or hold on to the handrail while traveling.

In an embodiment, the handrail is designed to be continuous, for example, in the form of an (endless) loop or a belt. In the embodiment mentioned, the handrail is guided over a handrail end curve at each end of the balustrade so that the handrail can run back in a region designed for this purpose, e.g., along the underside of the balustrade in a region inaccessible to the passenger. This inaccessible region is commonly referred to as the balustrade base. For this purpose, the handrail end curve can be designed, for example, in the shape of a semicircle or preferably a shape corresponding to a conic section. The handrail curve can be formed in the end region of the balustrade, the diameter of the handrail end curve approximately corresponding to the balustrade height, whereby the handrail end curve causes a deflection for the purpose of returning the handrail belt. In the region of the handrail end curve there can be a handrail inlet cap into which the handrail is inserted for return. The handrail inlet cap can also be designed to let the handrail run out, for example, when the direction of the handrail is reversed. Typically, a balustrade includes two handrail inlet caps, e.g., one handrail inlet cap at each end of the balustrade, the handrail running into the first handrail inlet cap and out of the second handrail inlet cap.

In a further embodiment, one aspect of the passenger transport system comprises a device for fastening a protective device in the region of a handrail end curve. The fastening device can be designed to fasten a protective device in the entire region of the handrail end curve. The fastening device can be designed to primarily allow fastening in a portion of the handrail end curve, for example, in a circular sector of the, e.g., semicircular handrail end curve, which has, from the handrail inlet cap, an angular range of 0 to a maximum of 90°, in particular up to a maximum of 120° or in particular spans up to a maximum of 180° of the handrail end curve. In addition to fastening in the region of the handrail end curve, the fastening device can also be designed to fasten a protective device in a region that protrudes beyond the region of the handrail end curve, for example, in the region of the handrail directly following the handrail end curve with a length of, e.g., 0-10 cm, but with a length of 0-20 cm or 0-30 cm.

In a favorable embodiment, the fastening device comprises partial elements of the balustrade, for example, bores or holes in the balustrade, which are provided for mounting a protective device. Further additional mounting elements can be part of the fastening device, such as, for example, sleeves or bolts that are mounted within the bores in the balustrade for installing the protective device. Parts of the fastening device can be part of the protective device itself, such as rods or metal sheets, which form a linkage that connects the protective curve with the sleeves in the balustrade.

The fastening device can be designed such that, if a protective device is not fastened, further mounting elements are provided in order to meet safety or aesthetic requirements. For example, in the case of bores in the balustrade, in the absence of a protective device blind sleeves or the like can be used to close the bore holes.

Other components of the passenger transport system can also be part of the fastening device or comprise same.

In a further embodiment, the passenger transport system comprises one or more sensors for detecting the presence of a protective device, in particular for detecting the expedient fastening of the protective device in the region of the handrail end curve. In a favorable example, the sensor can be arranged in the region of the handrail inlet cap, although other suitable positions are conceivable, including those that are not in direct proximity to the protective device. In an advantageous embodiment, a sensor can be attached to each handrail end curve, so that a total of at least four sensors are present in a typical passenger transport system having two balustrades, two handrails and four handrail end curves. In this context, a sensor is to be understood to mean any device that reliably detects the presence of the protective device and provides a signal based thereon; a sensor can thus also be composed of a plurality of sensor elements, and therefore does not have to be a single component or a separate component group. A sensor in the context of the present disclosure can thus range from a simple plug contact, a mechanical switch and the like to a surveillance camera having an image evaluation unit.

For the purpose of improved detection, the protective device can be designed such that it is specifically detected by the sensor. For example, the protective device can comprise an interaction element, the presence of which is detected by a sensor suitable for this purpose. For example, the interaction element can be a magnet and the sensor can be a magnetic sensor, for example, a Hall sensor or a reed switch. Numerous other combinations of interaction element and sensor are conceivable, for example, combinations of obstruction elements and light barriers, of an RFID tag and associated reading device, of electrical contact of a circuit and an interface.

Contactless interaction elements and sensors, such as the magnetic sensor described, are particularly advantageous since the handrail inlet cap, when the protective device is removed, does not have an interface which could be a target of acts of vandalism.

In a further embodiment, the passenger transport system comprises a control unit for controlling the direction of travel of the conveyor belt and the handrail, the direction of travel of the conveyor belt and the handrail generally also being understood to mean the direction of travel of the passenger transport system in general. The conveyor belt typically moves in the same direction as the handrail.

The control unit is connected to at least one sensor for detecting the protective device, but the control unit is preferably connected to a plurality of sensors and in particular to each of the sensors, such that, in a typical example, four sensor signals are available, the output values of which are dependent on the presence of a protective device on each of the four handrail end curves.

The control unit is configured to operate the passenger transport system in different directions of travel, e.g., in addition to the standstill of the passenger transport system, to also allow travel in a first and a second direction, for example, a forward direction and a backward direction.

The control unit can then prevent the movement of the passenger transport system, e.g., block the movement of the handrail and conveyor belt or not convert or forward a corresponding start signal if the direction of travel would result in a dangerous situation due to the handrail running into a protective device in the region of the handrail end curve. A direction of travel that causes such a dangerous situation is a blocked direction of travel.

A further dangerous situation may be that no protective devices are installed at all, or that only one protective device is installed when there are two handrails.

The control unit is therefore configured to evaluate the incoming sensor signals and to prevent travel in any direction in which the direction of travel would cause the handrail to run into a protective curve. This evaluation function can be carried out, for example, by implementing a simple truth table in which all sensor signals from the first end and all sensor signals from the second end are linked in the form of a logical connection with a target travel direction value that represents the set target direction of travel, such that when a protective device and a target travel direction value are simultaneously present, either a permissible control signal or a stop signal is output, depending on whether the target direction of travel causes the handrail to run into the protective device (=prohibited) or out of the protective device (=permitted). The implementation can take place, for example, by logic gates, software-based if/then functions, or the like. The control unit does not have to be a separate, physical unit; it can, for example, also be provided in the form of improved control software for the passenger transport system on a universal switching module.

In addition, the control unit can be set up to prevent travel in both directions if, in a system with a total of four handrail end curves, consisting of two end curves at the first end and two end curves at the second end of the passenger transport system, no protective devices, a single protective device, three protective devices or four protective devices are mounted. Depending on the particular passenger transport system, it can be advantageous to allow travel in both directions even if no protective devices are installed, in particular if this is harmless with regard to the safety requirements.

Equally, it can also be advantageous to allow a safe, permitted direction of travel of a passenger transport system with only one protective device on one of two handrails, for example, when the protective device on the second handrail end curve is not required for design reasons. The above-mentioned optional operating modes can preferably be set as required in the course of the installation or maintenance of the passenger transport system. Preferably, the setting of the optional operating modes cannot be carried out by persons with insufficient expertise or authorization. Preferably, the optional operating modes cannot be accidentally selected.

In an advantageous embodiment, the control unit is generally designed such that it only allows travel in the state in which two protective devices are installed on the opposite handrail end curves at the same end of the two balustrades and in which the passenger transport system travels in the direction in which the handrails run out of the protective devices; the protective devices are therefore located at the entry end of the passenger transport system. In this case mentioned, the logic implemented in the control unit can therefore also advantageously be designed such that, instead of initially allowing every state and only blocking in defined states, it instead prohibits every state and only allows travel if the state is the specifically mentioned, permitted state.

In a favorable embodiment, the passenger transport system comprises one or more protective devices which are attached in the region of the handrail end curves. The protective device can be designed in the form of a protective curve that encloses the handrail. A protective curve can have a largely curved shape, for example, predominantly the shape of a circular sector of the, e.g., semicircular handrail end curve, which has, from the handrail inlet cap, the angular range of 0 to a maximum of 90°, in particular up to a maximum of 120° or in particular spans up to a maximum of 180° of the handrail end curve. In addition to the protective curve, the protective device can also cover a region that protrudes beyond the region of the handrail end curve, for example, in the region of the handrail directly following the handrail end curve with a length of, e.g., 0-10 cm, but also with a length of 0-20 cm or 0-30 cm.

In a favorable embodiment, the protective device is divided into two parts in the running direction of the handrail, in particular in the region of the protective curve, so that the two parts are connected to one another during installation and together form a housing which at least partially encloses the handrail. In addition to the two parts, the protective device can also comprise further parts.

The connection of the parts of the protective device is preferably carried out in the course of fastening in the region of the handrail end curve. The protective device can be fastened using suitable fastening elements. The protective device can be fastened to the balustrade.

In a favorable embodiment, a gap between the protective device and the handrail in the end region of the protective device, e.g., where the handrail runs out of the protective device, is designed to be as narrow as possible, for example, with a maximum gap size of less than 4 mm, or less than 10 mm or less than 20 mm.

In a favorable embodiment, the protective device comprises a cover cap, in particular a two-part cover cap, which is located after installation in the region of the lower end of the handrail end curve, in particular in the region of the handrail inlet cap. The cover cap can completely or partially cover the handrail inlet cap. The cover cap can be movable relative to the other elements of the protective device, so that the position of the cover cap can be adjusted during installation such that the smallest possible gap is created between the protective device and the handrail inlet cap, for example, a gap of less than 4 mm or less than 10 mm or less than 20 mm. The position of the movable cover cap can be fixed after the adjustment, for example, by means of suitable fastening elements.

The protective device can comprise an interaction element for detection by a sensor provided therefor in the region of the handrail end curve. The interaction element can be positioned in the region of the covering cap, for example, attached to an element protruding from the body of the covering cap, or integrated into the covering cap. The interaction element, which can be a magnet, is preferably designed such that its position and orientation can be adjusted separately or together with other elements of the protective device. The interaction element is positioned in such a way that it interacts with the sensor to the highest degree possible and thus optimizes detection by the sensor, for example, by bringing it into a position closer to the sensor via the adjustment. An interaction element can be a plurality of interaction elements that interact with a plurality of sensors.

In a further embodiment, one aspect of the disclosure comprises a method for controlling a passenger transport system. The passenger transport system can be operated bidirectionally, e.g., it is suitable for transporting a passenger in two possible directions in addition to the standstill. The passenger transport system can be a locally installed system and can comprise a conveyor belt. The passenger transport system can include further features of a passenger transport system described above. The passenger transport system comprises at least one handrail, it being possible for the handrail to be covered by a protective device in the region of the handrail end curves. The handrail is moved during operation and, if a protective device is present, it can run either into or out of the protective device on the top side facing the passenger. A direction of travel in which the handrail runs into a protective device is a blocked direction of travel.

As a first step, the method includes determining the presence of a protective device using a sensor system configured for this purpose. Operation in a blocked direction of travel is then prevented as a result of the determination of the presence of the protective device.

The present disclosure has the advantage that protective devices can be installed and retrofitted quickly and easily without specially trained personnel, without extensive intervention in the control of the passenger transport system being necessary. In particular, the control system of the passenger transport system according to the disclosure can be configured to adjust itself depending on the presence of protective devices. In addition, the logic checks correct installation and ensures safe, standard-compliant operation.

In addition, the protective devices, for example, in the embodiments shown below, can be manufactured from a few individual parts and without moving parts, so that a robust design is possible. In particular, the purchase and maintenance price can be kept low at the same time.

The safety of the improved passenger transport system can be increased by the disclosure such that the use of protective devices is made simpler and more flexible, as a result of which they are more attractive for the operators of passenger transport systems and thus the protective devices are used more frequently.

BRIEF DESCRIPTION OF THE DRAWINGS

Embodiments of the disclosure will be described in the following with reference to the accompanying drawings, with neither the drawings nor the description being intended to be interpreted as limiting the disclosure. Furthermore, the same reference numerals are used for elements that are identical or have the same effect. In the drawings.

DETAILED DESCRIPTION

Figure 1:
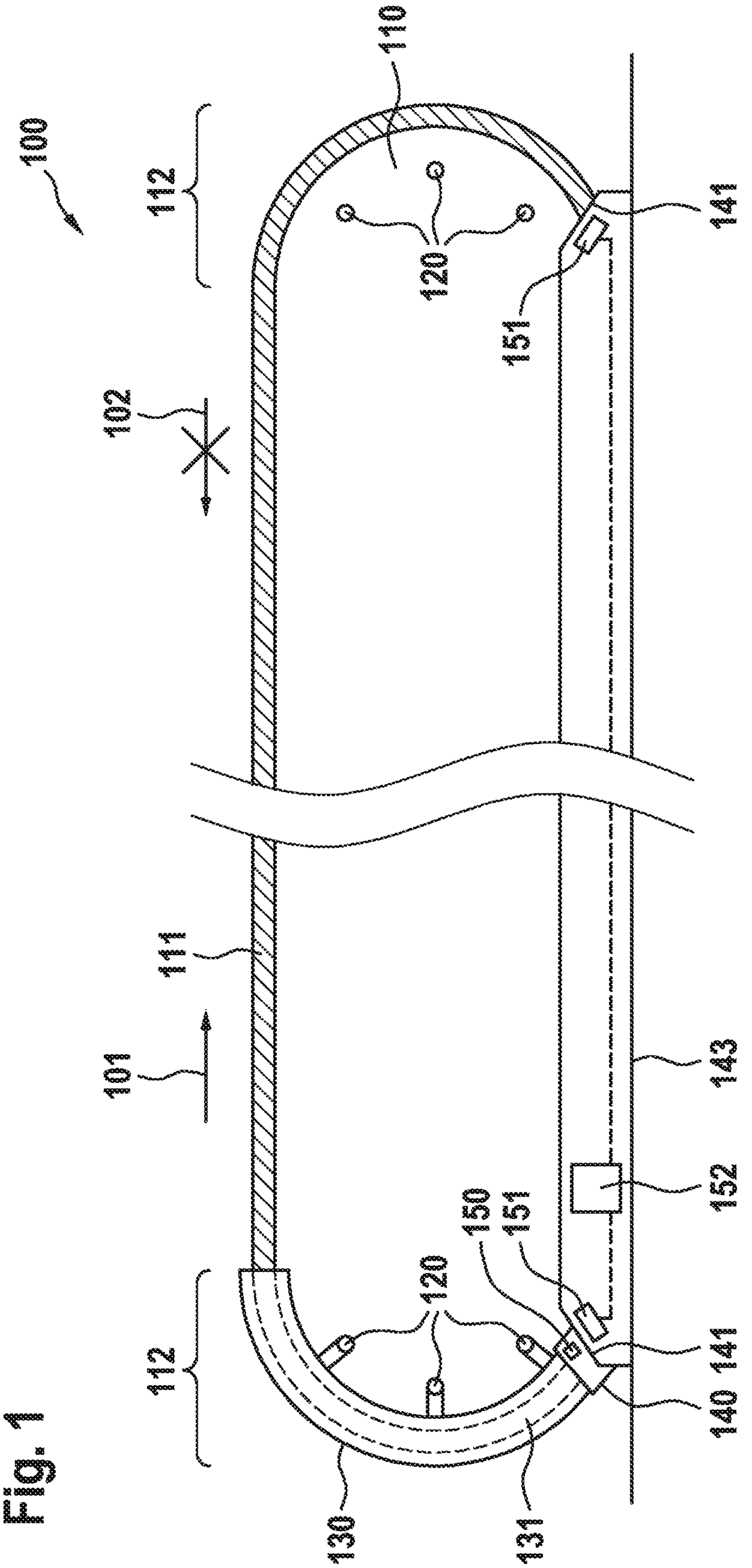
FIG. 1 shows a possible embodiment of a passenger transport system in the form of a moving walkway having a protective device.

FIG. 1 is a side view of a possible embodiment of a passenger transport system 100. The example shown is a horizontally guided moving walkway, but the features described below can be applied equally or in a similar way to an escalator.

The passenger transport system 100 shown comprises a conveyor belt (not shown) and, on both sides of the conveyor belt, a handrail 111 extending in the same direction, which is guided along a balustrade 110, although only one of the balustrades 110 with the handrail 111 is visible in the illustration shown in FIG. 1. The second balustrade 110 is designed analogously to the first balustrade.

The balustrade 110 contains fastening elements 120 at each end, which fastening elements are designed as bores in the balustrade 110 of the passenger transport system 100. If no protective device is installed, the bores are preferably closed reversibly using suitable plugs.

The passenger transport system 100 shown comprises a magnetic sensor 151 in the region of each handrail end curve 112, so that a total of four magnetic sensors 151 are present. In the example shown, the sensor 151 is installed in the vicinity of the handrail inlet cap 141, which closes a balustrade base 143, out of which the handrail 111 runs in the entry region or into which the handrail 111 runs at the exit end. The return of the handrail 111 thus takes place in the interior of the balustrade base 143.

The passenger transport system 100 furthermore comprises, for each handrail 111 at both ends, two handrail end curves 112 arranged in parallel with one another in the depth direction of the plane of the drawing. In the region of the handrail end bends 112 shown on the left in FIG. 1, a protective device 130 is additionally mounted on each of the handrails 111. The protective device 130 is fastened to the passenger transport system 100 by screwing to the balustrade 110 using the fastening device 120. The presence of the protective device 130 results in a permitted direction of travel 101 and a blocked direction of travel 102. If the position of the protective device 130 is changed from the handrail curve 112 shown on the left in FIG. 1 to the right-hand side, the permitted direction of travel and the blocked direction of travel are reversed.

In addition to the protective curve 131 covering the handrail 111, the protective device 130 comprises a cover cap 140 which is positioned in the vicinity of the handrail inlet cap 141 so that the outlet opening of the handrail 111 of the handrail inlet cap 141 is completely enclosed and covered by the cover cap 140 and unintentional penetration of foreign objects is prevented.

An interaction element 150 is located inside the cover cap 140, which is designed as a magnet in FIG. 1 and the position of which is selected such that it is in spatial proximity to the sensor 151 after the protective device 130 has been installed. The sensor 151 is configured to be able to reliably distinguish the presence of the magnet 150 from the absence of the magnet 150. If a protective device 130 is present on one of the handrail end curves, each associated sensor 151 generates a signal that can be received and evaluated by other components of the passenger transport system 100.

The passenger transport system 100 comprises a control unit 152 which is connected to the sensors 151 via electrical conductors and is configured to receive the relevant sensor signal. In addition, the control unit 152 is configured to operate the passenger transport system 100 by driving the conveyor belt and the handrails 111 in the same direction and orientation in the direction of travel 101 and the blocked direction of travel 102.

The control unit 152 is also configured to detect, on the basis of the signals from the sensors 151, whether a blocked direction of travel 102 is present. For this purpose, the entirety of the available sensor signals is evaluated and it is determined whether one or more protective devices 130 are mounted on one of the handrail end curves 112 of the passenger transport system 100. A direction that leads to the handrail 111 running into a mounted protective device 130 is a blocked direction of travel 102.

The control unit 152 is configured to not permit or to prevent operation of the passenger transport system 100 in a blocked direction of travel 102, such that, as a result of the effect of the features just described in the example shown in FIG. 1, the passenger transport system 100 can be operated only in the direction of travel 101.

It is possible that there are no blocked directions of travel, for example, when there are no protective devices 130 and the control unit 152 is additionally configured to allow this state, or that both directions of travel are blocked directions of travel, for example, when protective devices are present at both ends of the passenger transport system. In addition, the control unit 152 can optionally be configured to either permit travel in the permitted direction of travel 101 if only a single protective device 130 is present or, in the case mentioned, to block travel in both directions of travel 101, 102.

Figure 2A:
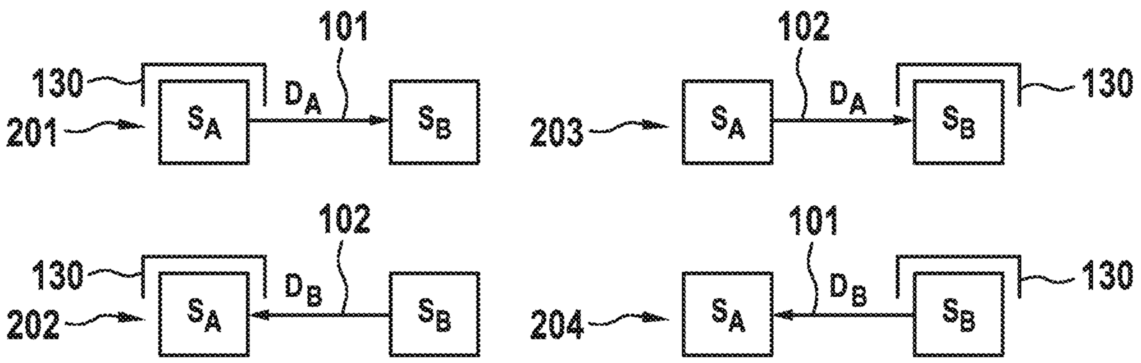
FIG. 2*a* is a schematic representation of possible operating states of a passenger transport system having a protective device.

In FIG. 2*a*, four possible operating states 201, 202, 203, 204 of a passenger transport system of the aforementioned type are shown schematically with regard to a single handrail and a single protective device.

The balustrade of this passenger transport system comprises two handrail end curves $S_A$, $S_B$, it being possible for a protective device 130, symbolically represented as a line, to be located either on the handrail end curve $S_A$ or on the handrail end curve $S_B$. The line represents the presence of a protective device 130 in the region of the handrail end curve $S_A$, $S_B$. The passenger transport system, and thus also the handrail thereof, can be operated in two directions $D_A$, $D_B$.

In state 201, a protective device is installed on the handrail end curve $S_A$ and the direction of travel $D_A$ leads to the handrail running out of the protective device. The state is allowed; the direction of travel $D_A$ is a permitted direction of travel 101.

In state 202, a protective device is installed on the handrail end curve $S_A$ and the direction of travel $D_B$ leads to the handrail running into the protective device. The state is not allowed; the direction of travel $D_B$ is a blocked direction of travel 102.

In state 203, a protective device is installed on the handrail end curve $S_B$ and the direction of travel $D_A$ leads to the handrail running into the protective device. The state is not allowed; the direction of travel $D_A$ is a blocked direction of travel 102.

In state 204, a protective device is installed on the handrail end curve $S_B$ and the direction of travel $D_B$ leads to the handrail running out of the protective device. The state is allowed; the direction of travel $D_B$ is a permitted direction of travel 101.

Figure 2B:
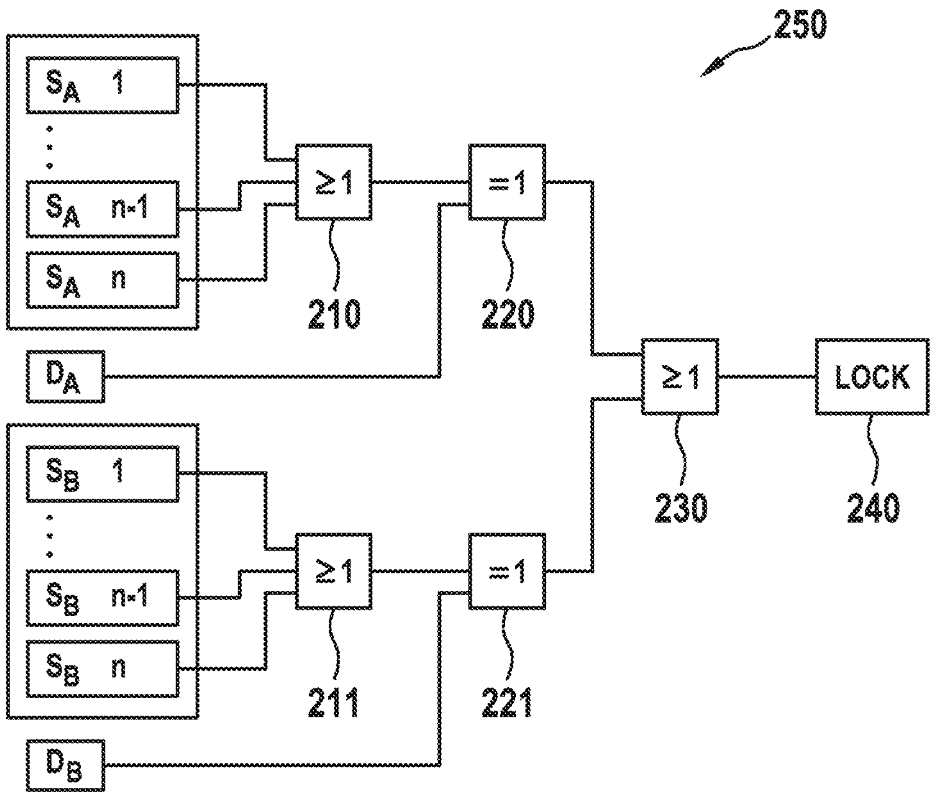
FIG. 2*b* shows a possible implementation of a control logic to prevent the operation of a passenger transport system in a blocked direction of travel.

FIG. 2*b* shows an example of an implementation of a control logic 250 for preventing the operation of a passenger transport system 100 in a blocked direction of travel 102 and serves as an example for an implementation of the method according to the disclosure for controlling a bidirectional passenger transport system 100. The naming of the input values corresponds to the schematic representation of the passenger transport system in FIG. 2*a*. In addition to the example shown in FIG. 2*a*, the control logic 250 is designed to control a passenger transport system having n balustrades and thus 2*n* handrail end curves; the input values $S_{A1}, \ldots, S_{An-1}, S_{An}$ and $S_{B1}, \ldots, S_{Bn-1}, S_{Bn}$ are therefore available. The values are positive if there is a handrail protection device in the region of the handrail end curve. The direction of travel values $D_A$, $D_B$ are available as further input values. The direction of travel values $D_A$, $D_B$ are positive when a control signal is present which is intended to cause the passenger transport system to travel in the above-mentioned direction of travel.

The signals $S_{A1}, \ldots, S_{An-1}, S_{An}$ are evaluated via OR gate 210, the signals $S_{B1}, \ldots, S_{Bn-1}, S_{Bn}$ via OR gate 211. This is an OR gate having n inputs; the person skilled in the art knows that such a gate can be implemented via a serial sequence of n−1 OR gates with 2 inputs each. The output value of OR gate 210 and the direction of travel signal $D_A$ serve as input values for Exclusive-OR gate 220, and the output value of OR gate 211 and the direction of travel signal $D_B$ serve as input signals for Exclusive-OR gate 221. The two output signals from gates 220 and 221 serve as input signals for OR gate 230. The output signal from OR gate 230 corresponds to a blocking signal 240: if the output value of 230 is positive, there is a blocking signal 240; if the value is negative, there is no blocking signal 240. The blocking signal 240 blocks the journey of the passenger transport system.

In the embodiment shown, the system can only be operated in the direction of travel $D_A$ if at the same time there is at least one protective device 130 on a handrail end curve $S_A$ and no protective device 130 on a handrail end curve $S_B$. Likewise, the system can only be operated in the direction of travel $D_B$ if at the same time there is at least one protective device 130 on a handrail end curve $S_B$ and no protective device 130 on a handrail end curve $S_A$. The cases whereby $D_A=D_B=0$ and $D_A=D_B=1$, which are irrelevant with regard to the protective devices 130, are not discussed in detail.

The blocking signal 240 is thus defined by the presence of a blocked direction of travel 102 in the form of a direction of travel signal (depending on the state, either $D_A$ or $D_B$) in combination with the presence of a protective device 130 (depending on the state, at least one signal from group $S_A$ or a signal from group $S_B$). The journey of the passenger transport system is prevented on the basis of the blocking signal 240.

Numerous other inexpensive designs or expansions of the circuit are conceivable, for example, to ensure that the correct number of protective devices is available and otherwise to block the journey, or to permit the journey if no protective devices are installed.

It is clear to a person skilled in the art that the embodiments shown are to be understood as examples and that numerous aspects of the disclosure can be carried out in other ways than those shown, and that certain features of the disclosure can be combined with one another in different ways in order to achieve the desired technical effect. The description therefore serves to disclose the disclosure with sufficient clarity and should not be considered to be limiting.

Finally, it should be noted that terms such as "comprising," "having," etc. do not preclude other elements or steps and terms such as "a" or "an" do not preclude a plurality. Reference signs in the claims should not be considered to be limiting.

The invention claimed is:

1. A passenger transport system, comprising:

a conveyor belt;

at least one balustrade extending substantially in parallel with the conveyor belt, the balustrade having a first end and a second end;

a handrail which is guided circumferentially along the balustrade between the first end and the second end, wherein at least one handrail end curve is located at the first end and at the second end;

a fastening device for mounting a protective device, wherein the fastening device for the protective device is positioned in proximity to the handrail end curve;

at least one sensor for detecting the presence of the protective device;

a control unit connected to the at least one sensor for controlling the direction of travel of the conveyor belt and the handrail, which control unit is designed to operate the passenger transport system in different directions of travel, wherein the control unit blocks the operation of the passenger transport system in one direction of travel on the basis of the sensor signal, such that, if there is at least one protective device in proximity to the handrail end curve, the direction of travel in which the handrail runs into the protective device is blocked.

2. The system of claim 1, wherein a protective device is fastened to the fastening device.

3. The system of claim 1, wherein the passenger transport system is an escalator having a step belt as a conveyor belt or a moving walkway having a pallet belt as a conveyor belt.

4. The system of claim 1, wherein the protective device is divided into two parts at least substantially in the direction of travel of the handrail and the two parts, after being connected, form a housing around the handrail in the region of the handrail end curve.

5. The system of claim 1, wherein the fastening device comprises mounting elements for fastening the protective device to one of the at least one balustrade.

6. The system of claim 5, wherein the fastening device comprises bores in the balustrade.

7. The system of claim 1, wherein the protective device comprises at least one interaction element, and wherein one of the at least one sensor is designed to detect the presence of the interaction element after the protective device has been mounted.

8. The system of claim 7, wherein the interaction element is a magnet, and wherein the sensor is designed to detect the presence of the magnet after the protective device has been mounted.

9. The system of claim 8, wherein the position of the magnet can be changed after the installation of the protective device for the purpose of fine adjustment.

10. The system of claim 1, wherein one of the at least one sensor is a magnetic sensor.

11. The system of claim 1, wherein one of the at least one sensor is positioned in a region of a handrail inlet cap of passenger transport system.

12. The system of claim 1, wherein each handrail end curve has a sensor for detecting a mounted protective device.

13. The system of claim 1, wherein the balustrade is a first balustrade and the passenger transport system comprises a second balustrade which has fastening elements and extends in parallel with the first balustrade, wherein the first balustrade and the second balustrade are arranged on both sides of the conveyor belt and extend in parallel therewith, and wherein the second balustrade has a first end having a first handrail end curve and a second end having a second handrail end curve and wherein the first ends of the first and second balustrades are opposite one another and the second ends of the first and second balustrades are opposite one another.

14. The system of claim 13, wherein the control unit is further configured to:

block the passenger transport system in both directions of travel if no protective device is present or a single protective device is present; and block the passenger transport system in both directions if at least one protective device is present at the first end and at least one protective device is present at the second end of either of the two balustrades.

15. A method for controlling a bidirectional passenger transport system, comprising:

determining the presence of a protective device in the region of a handrail end curve based on a sensor; and preventing the operation of the passenger transport system in a blocked direction of travel based on the determination of the presence of the protective device in the region of a handrail end curve, wherein the blocked direction of travel is defined by the handrail running into the protective device.

16. The method of claim 15, wherein the bidirectional passenger transport system is an escalator having a step belt as a conveyor belt or a moving walkway having a pallet belt as a conveyor belt..

17. The method of claim 15, wherein the protective device is positioned in proximity to a handrail end curve of a balustrade of the bidirectional passenger transport system.

18. The method of claim 15, wherein the protective device comprises at least one interaction element, and wherein the sensor is designed to detect the presence of the interaction element after the protective device has been mounted.

19. The method of claim 18, wherein the interaction element is a magnet, and wherein the sensor is designed to detect the presence of the magnet.

20. The method of claim 15, wherein preventing the operation of the passenger transport system in a blocked direction of travel base comprises:

blocking the passenger transport system in both directions of travel if no protective device is present or a single protective device is present; and blocking the passenger transport system in both directions if at least one protective device is present at the first end and at least one protective device is present at the second end of either of the two balustrades.

* * * * *